United States Patent [19]
Etwell

[11] 3,976,214
[45] Aug. 24, 1976

[54] SUGAR CANE PLANTER

[76] Inventor: Cecil Charles Etwell, High St., Walkerston, Via Mackay, Queensland, Australia

[22] Filed: Nov. 21, 1974

[21] Appl. No.: 525,804

Related U.S. Application Data

[63] Continuation of Ser. No. 294,700, Oct. 3, 1972, abandoned.

[52] U.S. Cl. ............................................. 214/519
[51] Int. Cl.² ............................................. B60P 1/36
[58] Field of Search ............. 214/519, 1 PA; 111/2, 111/3; 221/185; 198/75, 78, 80, 102, 103

[56] References Cited
UNITED STATES PATENTS

| | | | |
|---|---|---|---|
| 3,286,858 | 11/1966 | Julien | 111/2 X |
| 3,344,830 | 10/1967 | Longman | 111/3 X |
| 3,444,913 | 5/1969 | Arceneaux | 111/3 X |
| 3,468,441 | 9/1969 | Longman | 214/519 |
| 3,702,664 | 11/1972 | Clement | 221/185 |

Primary Examiner—Robert J. Spar
Assistant Examiner—Donald W. Underwood
Attorney, Agent, or Firm—Allison C. Collard

[57] ABSTRACT

This invention resides in cane planting apparatus which is operable to plant cane billets which have been deposited at random into a container such as during mechanical cane harvesting. In cane planting apparatus according to this invention, cane billets are transported from said container into a cane planting furrow by conveyor means which act firstly to align the cane billets in parallel relationship with the cane planting furrow and secondly, to feed said aligned cane billets into the cane planting furrow at regular intervals for planting therein.

1 Claim, 7 Drawing Figures

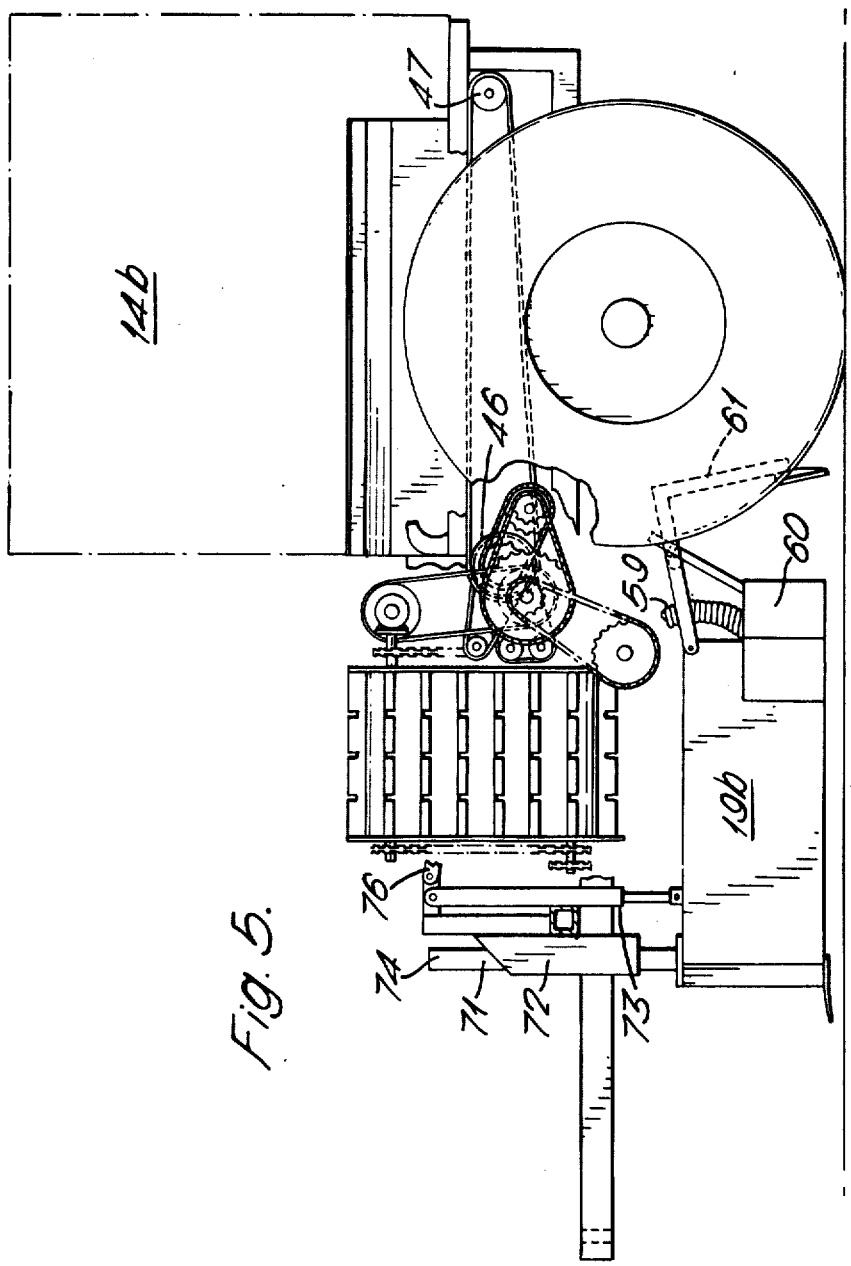

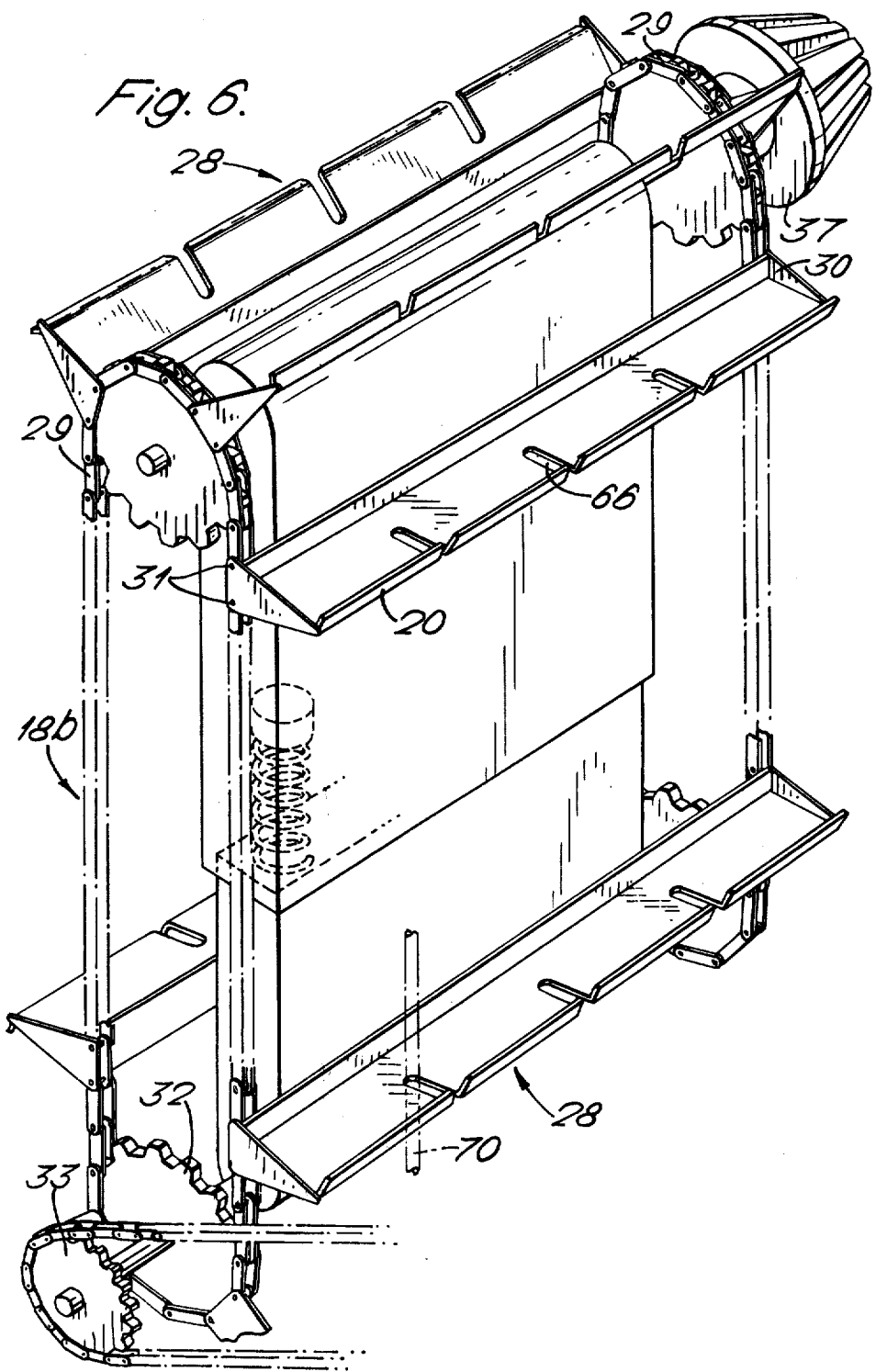

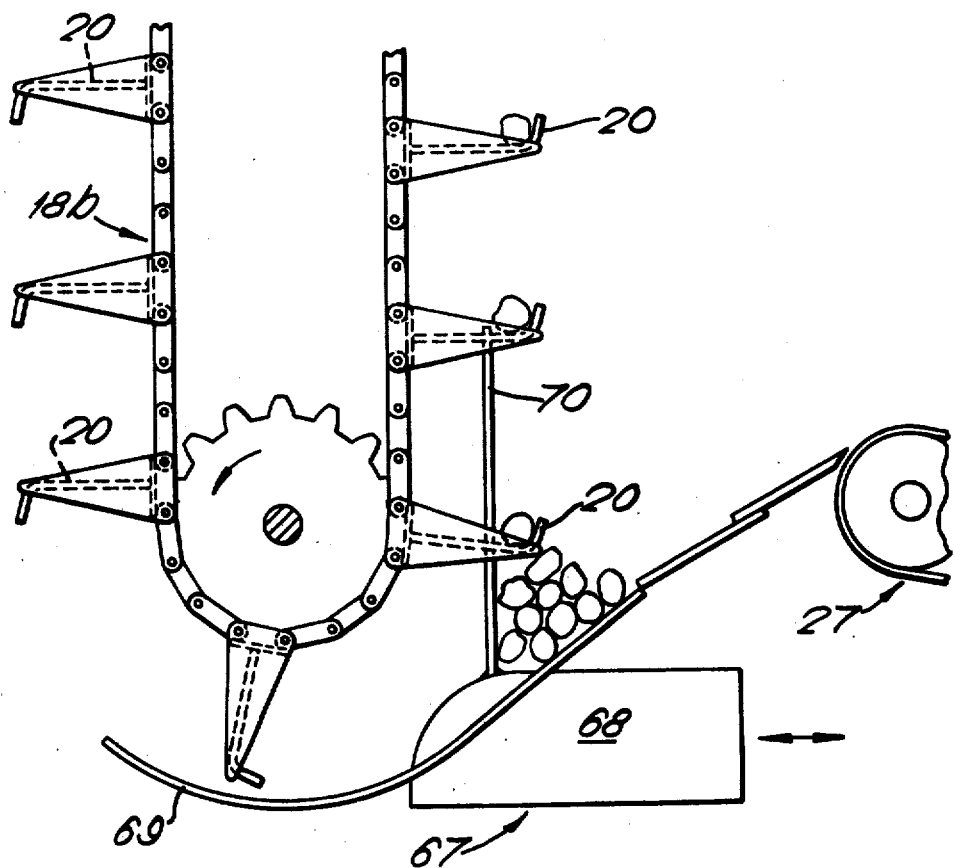

SUGAR CANE PLANTER

This is a continuation of application Ser. No. 294,700 filed Oct. 3, 1972 and now abandoned.

This invention relates to a new and improved sugar cane planter.

At the present time, it is customary to plant sugar cane by using whole sticks of cane, carried on the planting machine, the sticks being fed by hand down a chute on the machine where they are cut by a knife into sets for depositing in the furrows. While this current method is effective, it will be appreciated that it is very laborious and involves much labour in the cutting, cleaning and loading operations. Labour is not only expensive, but it can be scarce and at times impossible to obtain.

The present invention has been devised to overcome the aforesaid disadvantages, and it aims to capitalize on the fact that in most sugar-growing areas the majority of sugar cane is nowadays harvested by chopper-type cane harvesters which cut the cane into billets. This invention aims to use these billets for planting, and it provides a novel planting apparatus for that purpose.

Broadly, the invention resides in a cane planter having a mobile frame for supporting a container for cut cane billets and means for directing cane billets, unloaded from said container, onto a planting conveyor assembly for transport thereby to a chute for delivery to a cane planting furrow. Preferably, there are two containers each associated with a respective chute for supplying billets to two cane planting furrows at a time, the billets from the container being fed in two streams to the two hoppers. It is also preferred that an endless cane transporting conveyor be provided for conveying the billets to the planting conveyor assembly for transport thereby to the cane planting furrows. Other features of the invention will become apparent from the following description.

In order that the invention may be more readily understood and put into practical effect, reference will now be made to the accompanying drawings wherein:

FIG. 5 is a side elevational view corresponding to the plan view of FIG. 4;

FIG. 6 is an enlarged diagrammatic view of the planting conveyors showing the means of attaching the fingers or slats thereto; and FIG. 7 is a diagrammatic end view of the lower portion of the planting conveyors showing the adjusting mechanism for the cane billet supply.

Figure 1:
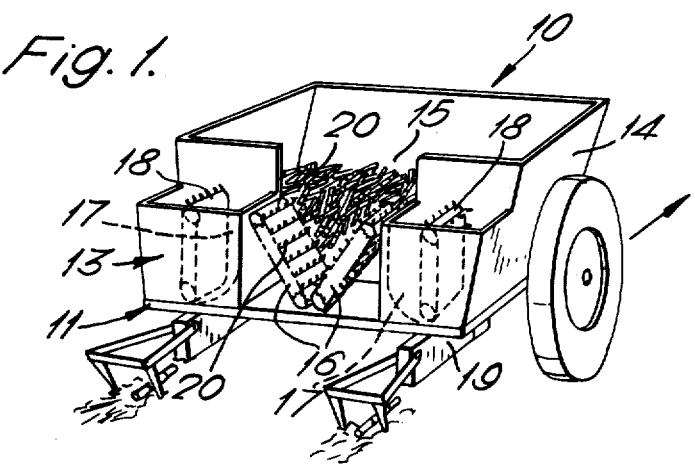
FIG. 1 is a rear perspective view of one form of cane planter in accordance with the invention.

Referring now to the embodiment illustrated in FIG. 1 there is shown a cane planter 10 which in this instance comprises a wheeled frame 11 on which the planting mechanism — indicated generally by the numeral 13 is mounted. The frame 11 is also adapted to carry a container 14 for the billets. If desired, a number of such containers may be provided, each detachably secured to the wheeled frame. Thus, the cane can be cut unburnt in the field and deposited in such a container or containers, the latter then being transported to the field to be planted. The container will then be lifted or handled by any suitable means to place it operatively on the wheeled frame, or alternatively the billets can be brought to the planter in some other form of container and transferred to a container 14 on the machine.

The container 14 has a detachable section (not shown) affording an opening 15 through which the billets may be raked into a V-shaped formation between two sloped conveyors 16 which comprise the means for directing cane billets to the planting conveyor assembly 18. The billets can be raked by hand, or they can be raked mechanically by a drive from the tractor, or from the planter wheels, or by any other suitable method. It will be seen that the conveyors 16 are arranged at a sharp angle and are fitted with fingers or slats 20, so that if the billets are deposited in the V-shaped formation in a crossed state, they will be automatically straightened into a horizontal attitude on the fingers or slats as they are moved up by the conveyors 16.

The conveyors 16 spill the billets over their upper ends to fall into two hoppers 17 from which the billets are elevated by further, substantially vertical planting conveyors 18, the slats or fingers 20 of which carry one billet at a time for delivery over the top and down into a chute 19 from the lower end of which the billets fall for depositing in the respective furrow. It will be apparent that the conveyors 16 fill the hoppers 17, and the fingers or slats 20 of the vertical conveyors 18 are of suitable predetermined length so that a single billet of average thickness — or a number thereof if they are small in diameter — travels up the conveyor for delivery at regular intervals to the chute for depositing into the soil in the conventional manner.

The conveyors may have driving sprockets driven from the planter wheels, or from the tractor power-take-off, or by other means at a rate which can be varied for different desired rates of planting. The sprockets or other drive components can suitably be fitted with suitable clutch device or other means for stopping rotation at required times. It will be appreciated that the machine can be a single row planter or a multiple-row planter, and mobility can be effected in numerous ways. For example, the planter can be drawn, or lifted by linkage or attached to a prime mover. The apparatus could be attached to a conventional type of planter having a drill for opening a furrow, with means for spraying, fertilizing and covering if desired.

Figure 2:
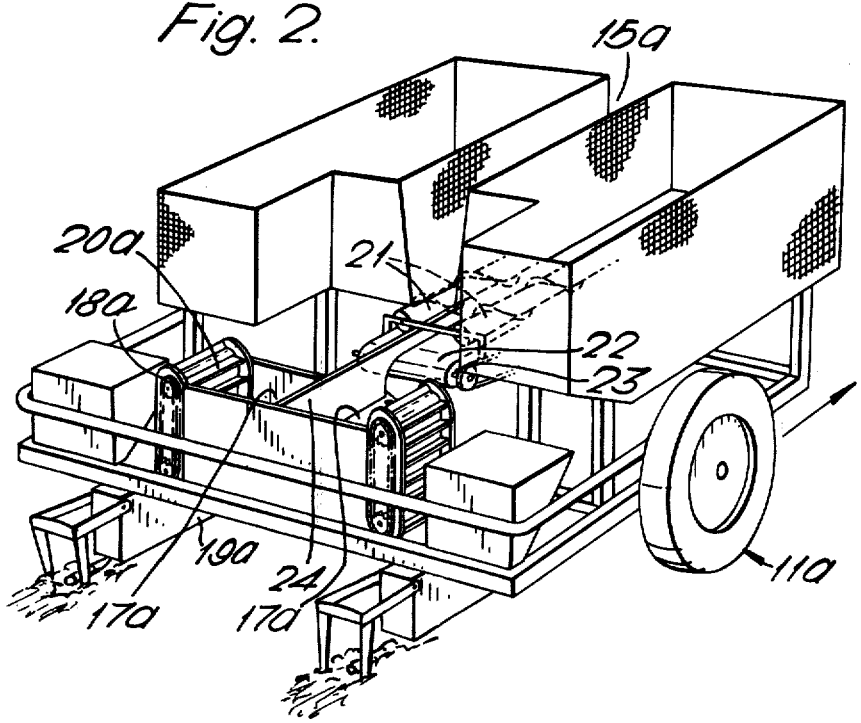
FIG. 2 is a rear perspective view of another form of cane planter in accordance with the invention.

In the various embodiments illustrated in the drawings the components have reference numerals corresponding to those of the earlier embodiment but suffixed by the letter *a* in FIG. 2 and by the letter *b* in FIGS. 3, 4, 5, 6 and 7. Thus where components are substantially identical or similar to the early components pertinent description in the earlier specification will apply to the same or corresponding components in this specification.

Referring now to FIG. 2 it will be seen that the two conveyors 16 of the original machine are no longer used in their original form, this being provided originally to sort the cane which was to be raked into the V-shaped formation between them. It will be seen that augers 21 are placed longitudinally along the medial line of the planter over the cane transporting conveyor belt 22.

The conveyor belt 22 extends along between the two containers 14a between rollers 23 the axes of which are parallel with the axes of the ground wheels 11a. The cane transporting conveyor belt 22 is divided into two sections by central upstanding web 24 which extends along the full length of the cane transporting conveyor 22. The contra-rotating augers 21 extend along above the cane transporting conveyor belt 22 and adapted to straighten the billets or sets which fall on the conveyor the latter travelling at a predetermined speed so that the cane billets are thrown into the containers where they are stored to be picked up by fingers or slats 20a on the conveyors 18a and deposited in the furrows through chutes 19a. In other words, the cane is straightened by the contra-rotating augers 21, conveyed by the belt 22 and deposited in the containers for conveyance to the furrow, while in other respects the machine is substantially the same as the original embodiment.

More particularly, the container 14a has a detachable section through which billets can be raked onto the contra-rotating augers 21 which align the billets longitudinally whereupon they fall onto the belt or conveyor 22 in parallel relationship with the planting furrows. They can be raked by hand or they can be raked mechanically by a drive from the tractor or from the planter wheels — or by any other suitable method. It will be seen that they travel along belt 22 at a rate so that they drop clearly into the two hoppers 17a (not illustrated).

Figure 3:
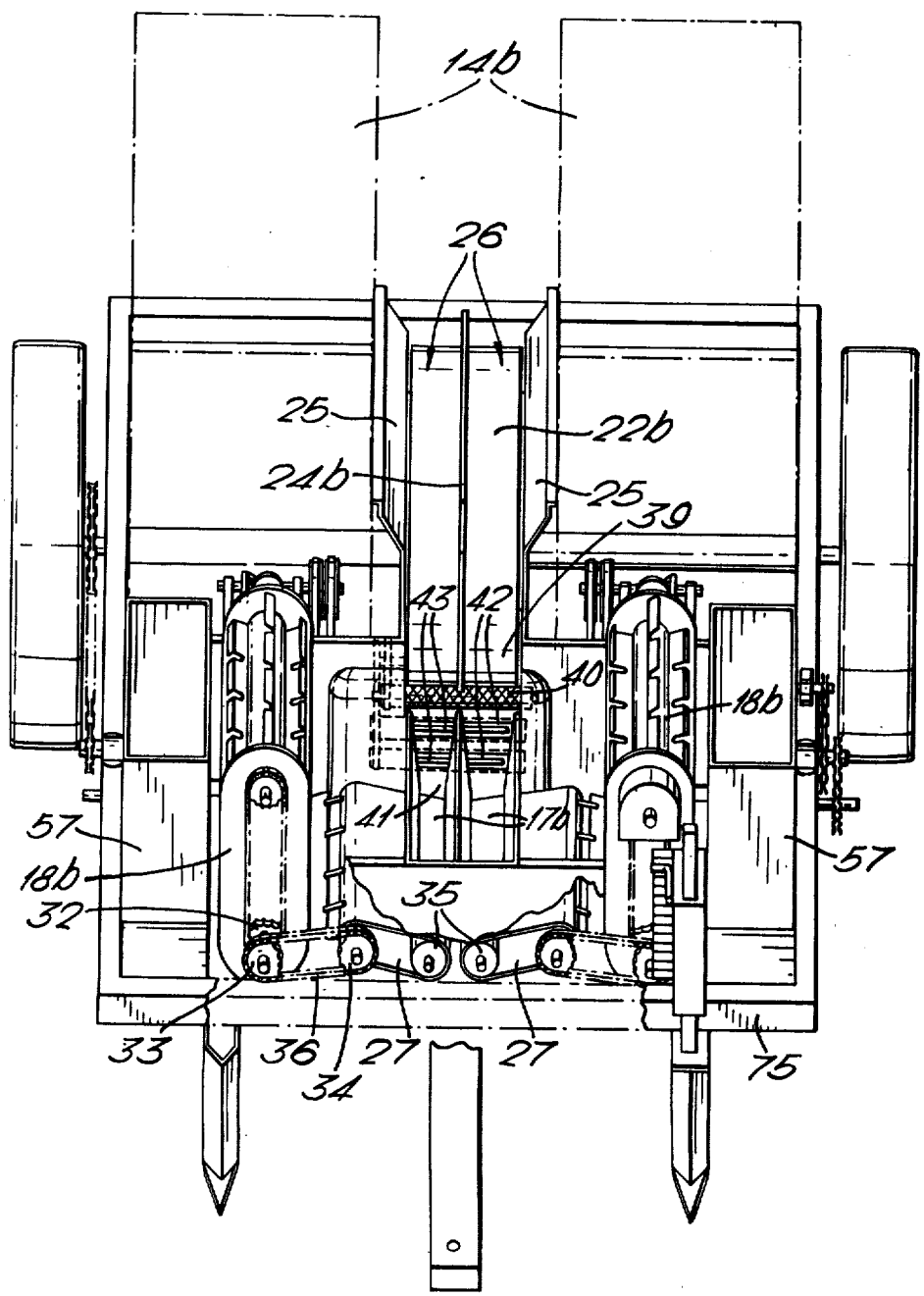
FIG. 3 is a front perspective view of the preferred form of cane planter in accordance with the invention shown with cut-away panels to illustrate the workings of the assembly.

In the preferred embodiment illustrated in FIG. 3 the general lay-out is similar to that illustrated in FIG. 2. However, in this embodiment the central upstanding web 24b extends upwards much further than in the earlier embodiment and two shaped side plates 25 are provided, placed in parallel with the central upstanding web 24b, to form two elongate inlet chutes 26 which direct cane billets unloaded from the containers 14b onto the cane transporting conveyor 22b. The upper edges of the shaped side plates 25 and the central upstanding web 24b are spaced apart such a distance as to provide a restricted opening into the inlet chutes 26 so that cane billets falling thereon will pass through the elongate chutes 26 only if the billets are aligned with their longitudinal axes substantially parallel with the cane furrows. Thus, the contra-rotating spirals 21 of the earlier embodiment are not needed.

Also, as illustrated the two hoppers 17b are remote from the vertically disposed cane planting conveyors 18b, and intermediate conveyor assemblies 27 are provided to transport the pre-aligned uni-directional cane billets from the hoppers 17b to the cane planting conveyors 18b. As shown in FIG. 3 and FIG. 6, each planting conveyor comprises a pair of upper and lower spaced apart sprocket assemblies 28 around which two endless chains 29 pass. Each endless chain is provided with mounting flanges 30 which connect to the pins 31 of the chain links, and the slats 20 extend across between the chains 29 and are connected thereto by the mounting flanges 30. Suitably, the mounting flanges 30 are provided at four inch intervals along each of the chains 29. In order to ensure that the chain remains taut so that the slats 20 extend outwardly at substantially right angles to the chain, the bottom sprocket assembly 32 is spring-urged downwards with respect to the upper sprocket assembly which is fixed to the main frame. In order to prevent cane billets falling from the cane planting conveyors, end walls and inner walls (not shown) are provided. Also, the lower sprocket assembly 32 has another sprocket 33 attached thereto, as illustrated, which is adapted to be interconnected with a similar sprocket 34 fixed to one of the spaced apart rollers 35 about which the intermediate conveyor belt passes. Thus, driving power is transmitted from the planting conveyors 18b to the intermediate conveyor assembly by the chain 36. The upper sprocket assembly 28 is provided with a bevel gear 37 which forms part of a right angle drive assembly 38, the operation of which will be described hereafter.

The cane transporting conveyor belt 22b is arranged to travel at a predetermined speed so that cane billets thereon will be thrown from the front end 39 of the conveyor belt 22b into the hoppers 17b. In order to assist the movement of cane billets from the conveyor belt 22b into the hopper 17b there is provided an upper roller 40 which is aligned with the upper surface of the belt and assists the passage of cane billets from the conveyor 22b into the hoppers 17b. This is to ensure that the billets are thrown across the full length of the hoppers 17b so that they will fall down and rest upon the intermediate conveyor assemblies 27. If a cane billet does not pass right across the hopper 17b, then it could possibly jam between the conveyor assemblies 27 and the back wall 41 of the hopper 17b. In order to prevent such an occurrence happening, there are provided two additional rollers 42 which rotate in the same direction as the roller 40 and which are provided with cut-outs 43 which are adapted to engage the end face of a cane billet and fling the billet down onto the respective conveyor assembly 27. As seen clearly in FIGS. 3, 4 and 5, the upper roller 40 and the two additional rollers 42 are belt driven independently from pulleys 44 mounted on and fixed to the support shaft 45 of the driven front roller 46, about which the front end 39 of the conveyor passes. The back roller 47 of the transporting conveyor belt 22b is freely rotatable and is selectively movable in the direction of travel of the conveyor to adjust the tension of the conveyor belt 22b.

In this embodiment the drive for the various components of the cane planter is taken from one of the ground engaging wheels 48. The drive train will now be described with reference to FIGS. 4 and 5. The drive is transmitted from the ground engaging wheel 48, which is mounted on a stub-axle, as is the other wheel, to a main torque transmitting cross-shaft 49, through a four to one reduction chain drive assembly 50. The cross-shaft 49 is supported in bearings 51 located on opposite sides of the main frame and the end of the cross-shaft 49 remote from the chain drive assembly 50 has fixed thereto a large sprocket which forms part of a chain drive assembly 52 and a small sprocket which forms part of a chain drive assembly 55.

The chain drive assembly 52 transmits power to a transverse shaft 53 which extends halfway across the frame to connect operatively with a cane transporting conveyor belt drive 54 which connects the shaft 53 to the support shaft 45 of the front roller 46. The various reductions in the chain drive assemblies are arranged so that the front roller rotates at about one hundred revolutions per minute so that the surface speed of the conveyor belt 22b is sufficient to throw cane billets across the upper roller 40 into the hoppers 17b.

The chain drive assembly 55 transmits power from the main cross-shaft 49 to a secondary cross-shaft 56 which extends across the frame in parallel relationship with the cross-shaft 49. This cross-shaft 56 is adapted to pass through the lowermost portions of the fertilizer hoppers 57, shown in FIG. 3, and it is provided with, at each hopper, an auger assembly 58 (see FIG. 4) which supplies fertilizer to a delivery pipe 59 (see FIG. 5) which connects with the fertilizer distributing boxes 60 located at the lower rear ends of the chutes 19b through which the cane billets are deposited into the cane furrows. These distributing boxes 60 supply a row of fertilizer to both sides of the furrow about the deposited cane billets and a tyne assembly 61 is connected adjustably to the chutes 19b for covering the deposited cane billets with the free soil at the sides of the furrows.

Figure 4:
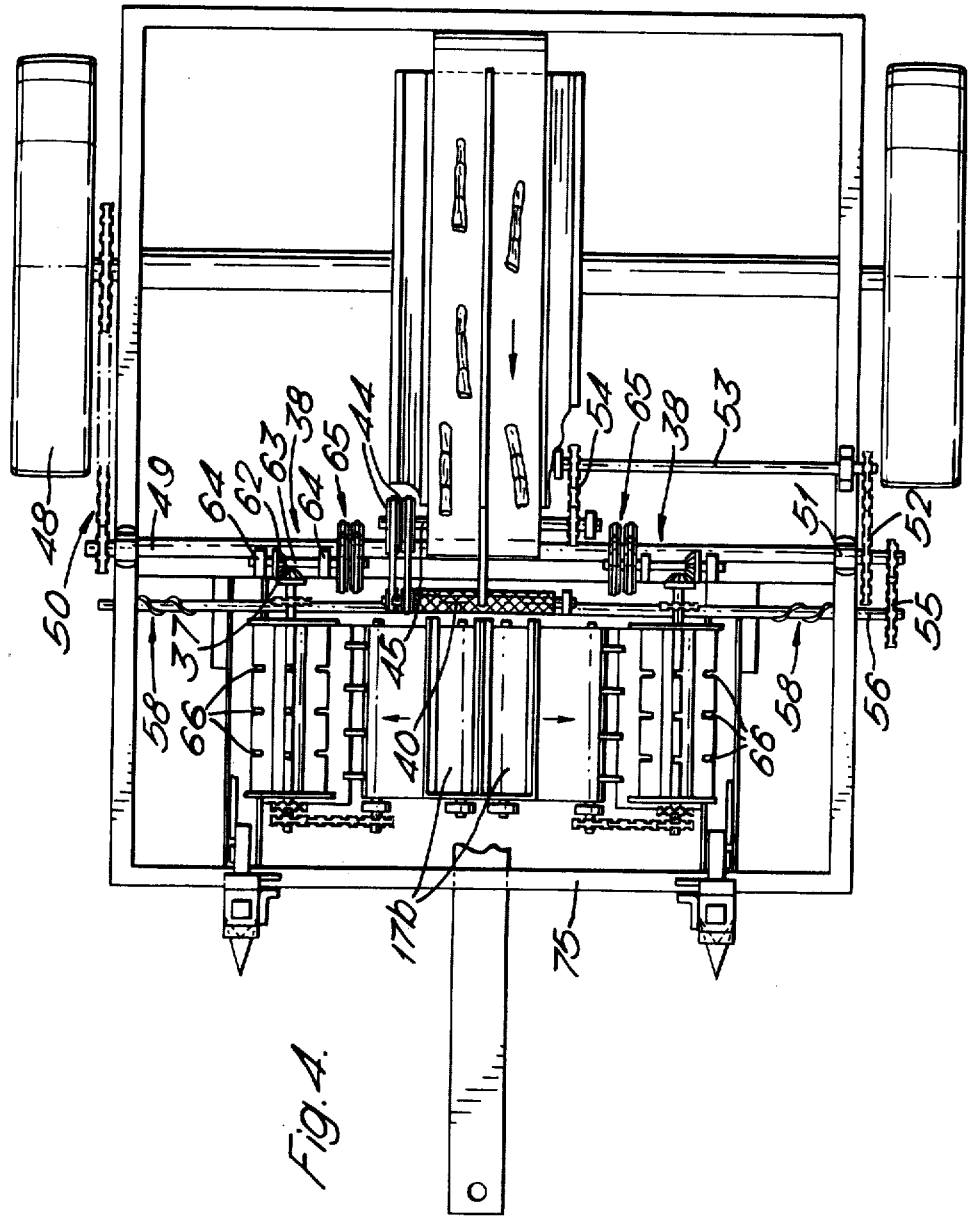
FIG. 4 is a plan view of the cane planter illustrated in FIG. 3 and illustrating in particular the mechanical inter-relationship of the components of the cane planter.

Each of the right angle drive assemblies 38 in FIG. 4 comprises a first bevel gear 37 connected to the upper sprocket assembly 28 and a second mating bevel gear 62 which is mounted on a stub-axle 63 located rotatably on the main frame by bearing housings 64. The stub-axles 63 extend inwardly of the bearing housings 64 and are provided with at their inner ends a pair of sprockets which are connected by chains to a pair of corresponding sprockets mounted on the main cross-shaft 49. These sprockets and chains form the chain drive assemblies 65 for the right angle drive assemblies 38.

The slats 20 of the cane planting conveyors 18 are as shown provided with three cut-outs 66 which are adapted to pass about an adjustable gauge bar assembly 67. This assembly comprises three upstanding plate members 68 which pass through slots in the lower housing 69 and each plate is provided with a vertically extending rod 70 which is welded thereto and is adapted to pass upwards within the aligned cut-outs 66 of adjacent slats 20. The assembly 67 is connected with the lower housing 69 for movement towards or away from the lower sprocket assembly 32 as an adjustment to vary the amount of free slat extending beyond the upright rods 70. The assembly 67 is adjustable to provide for the desired amount of free slat which extends beyond the upright rods 70. Thus, the aligned cane billets delivered to the vertical planting conveyors 18b by the intermediate conveyor assemblies 27 will build up on the lower housing 69 and will be collected by the slats 20 as they pass through the cane build up. In this manner, by means of conventional mechanical movement of assembly 67, the amount of free slat 20 projecting beyond the rod 70 will determine how much cane is picked up during each pass. Normally, the distance is adjusted so that only one billet of cane is picked up at a time. This distance needs to be variable because the diameter of cane varies greatly from one species to another.

The chutes 19b are connected rigidly to an upstanding shaft 71 which passes slidably through a housing 72 bolted to the front cross-member 75 of the main frame. A hydraulic ram 73 is connected between the upper end of the housing 72 and the chute 19b so that the depth of penetration of the chute 19b can be varied. Preferably, the upper end 74 of the shaft 71 is provided with a pointer which registers on a scale on the housing 72 so that a pre-selected furrow depth can be quickly obtained. Also the upper end of the housing is connected to the main frame by a link 76 which prevents rotation of the housing 72 about the front cross member 75, and the housing 72 is bolted to the front cross member 75 so that the distance between the two chutes 19b can be selectively varied by movement towards or away from one another along the cross shaft 75.

In operation containers 14b are connected operatively to the main frame and cane billets are fed therefrom onto the cane transporting conveyor 22b. As the cane in the containers 14b is as cut, it will include much trash and some short pieces which are unsuitable for planting. It will also be arranged at random in order to get rid of the unwanted material before passing into the cane planting furrow, the front end 39 of the conveyor 22b is spaced apart from the upper roller 40 a suitable distance, depending upon the speed of the conveyor, but in this embodiment about 9 inches. This causes short lengths of cane and trash to be projected from the belt 22b at an angle to the horizontal. These short lengths of cane and trash do not reach the upper roller 40 and therefore they just fall down onto the ground. The correct length cane billet will continue in a substantially horizontal attitude from the conveyor 22b until it reaches the upper roller 40 which assists the billet in its passage into the hoppers 17b.

The cane planter is also provided with a pair of storage tanks which contain spray fluid which is pumped to the chutes 19b and is sprayed onto the cut ends of the cane billets. Also a seat is provided at the front end of the planter so that an operator can supervise the operation of the cane planting conveyors and a platform is provided at the back of the planter, to allow another operator to stand and supervise the discharge of cane billets from the containers to the cane transporting conveyor 22b.

I claim:

1. A sugar cane planter having a mobile frame for supporting a container for cut cane billets and means associated with said mobile frame for transporting cane billets from said container to a cane planting conveyor assembly associated with said mobile frame for delivery thereby to a guide chute adapted to direct said cane billets into a cane planting furrow; wherein said cane planting conveyor assembly comprises a plurality of elongate cane supporting members connected in spaced relationship around an endless conveyor assembly traveling around an upper rotatable support assembly and a lower rotatable support assembly, said cane supporting members extending across said endless conveyor assembly and being constructed and arranged for upward travel between said lower and upper support assemblies while in a substantially horizontal disposition one above the other and projecting outwardly from said endless conveyor assembly for supporting thereon a cane billet for travel over said upper support assembly and falling into said guide chute; and wherein a regulating means associated with said cane planting conveyor for regulating the rate of delivery of said cane billets into said guide chute comprises a gauge bar assembly located adjacent said lower support assembly and adapted to extend across said cane supporting members to provide a substantially vertical cane billet abutting face, said gauge bar assembly being selectively movable horizontally towards or away from said lower support assembly to vary the free portion of the cane supporting members which extend beyond said cane billet abutting face remote from said lower supporting assembly, said free portion being adapted to pass vertically through a bed of prealigned cane billets to collect a cane billet thereon and convey it to said guide chute.

* * * * *